US011114022B2

(12) United States Patent
Prathaban et al.

(10) Patent No.: US 11,114,022 B2
(45) Date of Patent: Sep. 7, 2021

(54) MICRO DISPLAY AMBIENT COMPUTING

(71) Applicant: Intel Corporation, Santa Clara, CA (US)

(72) Inventors: Satish Prathaban, Beaverton, OR (US); Kunjal S. Parikh, Fremont, CA (US); Vivek Paranjape, Portland, OR (US); Vishal Ravindra Sinha, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/729,225

(22) Filed: Dec. 27, 2019

(65) Prior Publication Data

US 2020/0135093 A1 Apr. 30, 2020

(51) Int. Cl.
*G06T 15/00* (2011.01)
*G09G 3/32* (2016.01)

(52) U.S. Cl.
CPC ....... *G09G 3/32* (2013.01); *G09G 2310/0275* (2013.01); *G09G 2320/0276* (2013.01); *G09G 2320/0666* (2013.01)

(58) Field of Classification Search
CPC ............. G09G 3/32; G09G 2320/0666; G09G 2320/0276; G09G 2310/0275
See application file for complete search history.

(56) References Cited

U.S. PATENT DOCUMENTS

| | | | | |
|---|---|---|---|---|
| 10,395,588 | B2 | 8/2019 | Ahmed et al. | |
| 10,475,417 | B2 | 11/2019 | Jiang et al. | |
| 2016/0098144 | A1* | 4/2016 | Yang | G02F 1/1345 345/174 |
| 2017/0287399 | A1 | 10/2017 | Ahmed et al. | |
| 2018/0198980 | A1 | 7/2018 | Takagi et al. | |
| 2019/0131345 | A1 | 5/2019 | Ahmed et al. | |
| 2019/0295464 | A1* | 9/2019 | Ishii | G09G 3/3225 |

* cited by examiner

*Primary Examiner* — Deeprose Subedi
(74) *Attorney, Agent, or Firm* — Alliance IP, LLC

(57) ABSTRACT

A display device includes a backplane, where a portion of the backplane is associated with a particular pixel of a display, and the display includes an array of pixels. The display further includes at least a particular light emitting diode (LED) on the portion of the backplane to implement the particular pixel and local memory located with the particular LED on the portion of the backplane, where the local memory is to store data to be used to control the particular LED and presentation at the particular pixel.

20 Claims, 11 Drawing Sheets

MICRO DISPLAY AMBIENT COMPUTING

TECHNICAL FIELD

This disclosure relates in general to the field of computer systems and, more particularly, to light-emitting diodes (LEDs) and microLED devices.

BACKGROUND

A light emitting diode (LED) is a two-lead semiconductor light source. More simply, LEDs are essentially p-n junction diodes that emit light when activated. This effect is called electroluminescence, and the color of the light emitted is determined by the energy band gap of the semiconductor material. Traditional LEDs are typically of a size on the order of hundreds of microns. In contrast, micro-sized LEDs (or microLEDs) are of a size on the order of tens of microns or less. Micro LED displays can provide brighter screens and wider color ranges than that achievable using traditional LED or organic LED (OLED) displays. Micro LEDs are an emerging technology area, and demand for micro LED-based technology platforms in devices such as consumer wearables (for example, watches, augmented reality devices, virtual reality devices) and mobile or stationary display devices is increasing rapidly. Such devices may require a full color range, high brightness (for example, more than 2,000 cd/m.sup.2), high contrast, low power requirements, high pixel densities (for example, more than 2,500 pixels per inch), and low manufacturing costs. To make active matrix micro LED display panels capable of satisfying these requirements, many workflows produce individual micro LEDs that are tuned to emit red, green or blue colors on separate wafers. These micro LEDs are then transferred from the original wafers to thin film transistor (TFT) backplanes to make red, green, and blue (RGB) pixels that make up the active matrix LED display panel. In other words, conventional micro LEDs may be made up of micron sized digital components formed on appropriate substrates, separated from those substrates, and then placed together on one new substrate.

BRIEF DESCRIPTION OF THE DRAWINGS

Like reference numbers and designations in the various drawings indicate like elements.

DETAILED DESCRIPTION OF EXAMPLE EMBODIMENTS

Figure 1A:
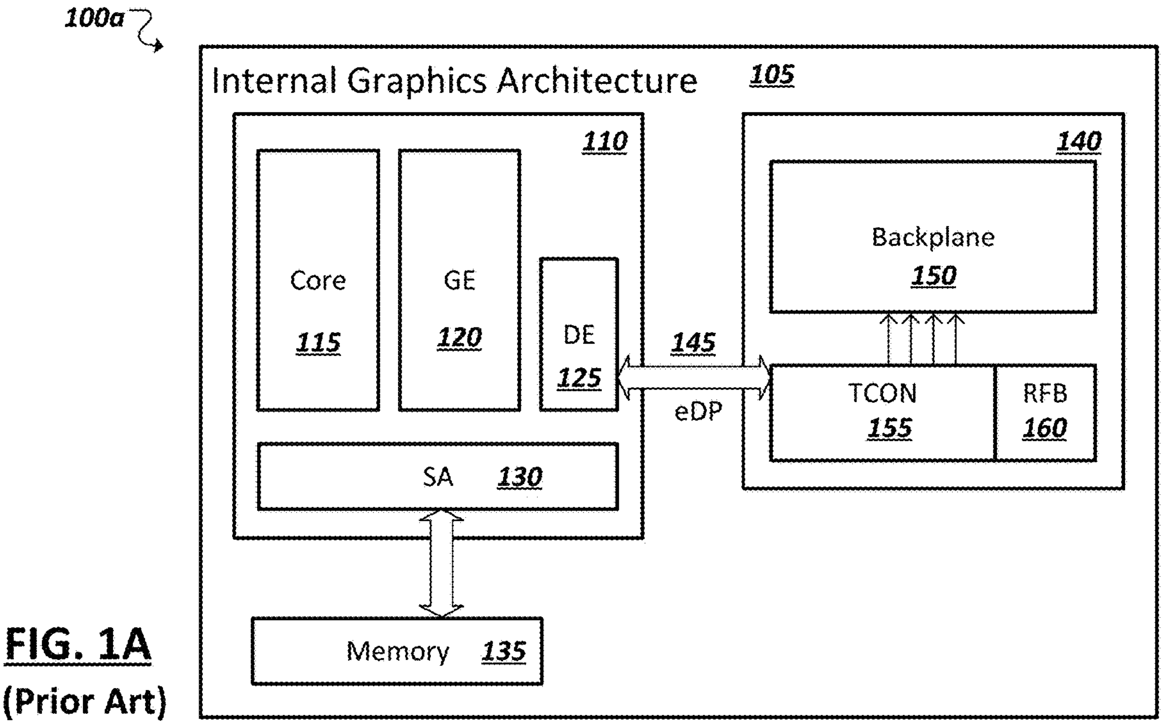
FIG. 1A (Prior Art)
FIGS. 1A-1B are simplified block diagrams illustrating conventional computer display architectures.

Emerging micro display technologies utilize microscopic implementations of light emitting diodes (LEDs) (e.g., micro LEDs, micro OLEDs, micro QLEDs, etc.) to form individual pixel elements within a display. Indeed, an array of such LEDs may be provided to implement a digital display. MicroLED technology, for instance, may provide higher total brightness and high contrast ratio, while at the same time offering higher efficiency and power consumption that other, conventional LED technologies (e.g., organic LED (OLED), and greatly reduced energy consumption over conventional liquid crystal display (LCD) technologies, among other example advantages.

In the case of microLEDs, gallium nitride (GaN)-based LED elements may be implemented which, in some cases, are LEDs with dimensions smaller than 100 μm. When illuminated a micro LED device may present a pixel with an effective width many times wider than the dimensions of the micro LED itself. In some implementations, displays may be constructed from an array of microLED elements to realize a particular display resolution, where the pixel pitch and corresponding distance between LED elements results in untapped real estate (e.g., on the backplane or semiconductor substrate holding the LED elements) on a per pixel basis (e.g., the unused silicon area between neighboring microLEDs and the pixels they implement). The efficiency and miniature size of microLEDs realize such "extra" space on the backplane, which was not the case (nor possible) in traditional display technologies (e.g., including mini LED technology). In some implementations, this unused real estate may be utilized to enhance a microLED-based display, for instance, by using this area to implement in-pixel memory, in-pixel compute, antennae, and other compute logic for the displays or subareas (e.g., sections, rows, columns) of the display, among other examples In traditional personal computing systems, memory and processing capabilities are concentrated on that portion of the device (e.g., a personal computer, laptop, wearable, smartphone, etc.) physically supporting the central processing unit, processing core, graphics processing unit, and other processing capabilities of the host. As an example, traditional laptop computers locate all processing resources on the base of the device, with no processing capabilities on the lid (e.g., where the display is located). For instance, traditional laptops may dedicate the lid to the display, one or more antennas, and one or more sensors (e.g., cameras, microphones, light sensors, etc.). Moreover, adding processing and memory to traditional displays is likely to increase the thickness of the device, which may undermine efforts to address demand for devices with thinner and lighter form factors. An improved micro display device (e.g., utilizing microLED, microOLED, or microQLED technology) may integrate memory and/or compute resources on the display (e.g., on the same substrate where the LEDs are mounted or grown and within the pitch between LEDs), thereby taking advantage of previously untapped real estate per pixel which does not exist in traditional display technologies. This real estate can be used to integrate new functionalities in to display that can enable new capabilities, such as improved or true bezel-less display, improve thermal dissipation and performance for small form factor designs by distributing compute on base and the display in the lid, non-isochronous high speed I/O architecture from base to lid to simplify the design of the host compute and timing controls, enable per-pixel addressing and addressing per-pixel memory, and improved per-pixel power management through the reduction of display power to increase battery life of the system, among other example features and advantages.

Traditional systems have attempted to address efficiency and power issues in personal computing systems through solutions such as Panel Self Refresh (PSR), timing controller (TCON) embedded driver (TED), and Embedded Display Panel (eDP) interface technologies, among other examples. For instance, PSR displays integrate remote frame buffer (RFB) in to the display timing controller (TCON) so that during idle desktop the display can refresh from RFB, consequently allowing the host processor (e.g. system on chip (SoC)) of the system to enter low power sleep state. PSR thus lowers the SoC power usage, but does not significantly lower display power. Furthermore, in PSR, the system TCON imposes a power penalty every time it self-refresh the display, because it will have to light up the source and row drivers, among other example issues. A TED is designed to lower the bottom bezel size by integrating the TCON on to the glass (e.g., chip on glass). While a TED implementation helps to reduce the bezel size of at least one side of the display (e.g., the bottom frame), it has challenges in integrating the RFB on the glass because it increases the complexity of manufacturing and typically increases the width of at least one bezel (e.g., the bottom bezel). In short, TED displays are able to achieve narrow bottom bezel, but without integration of RFB, hence at higher SoC power. Further, while eDP has become a widely used internal display interface in mobile PC systems, the eDP protocol is defined to operate at the per-frame (e.g., non-PSR and PSR1), or -scanline (PSR2) boundaries, and does not implement or support pixel-wise updates, leaving some inefficiencies, which may be improved upon in next generation technologies. Indeed, an improved computer display architecture, such as discussed herein, may address many of the challenges of existing displays, such as power, cost, bezel width, and inefficient interconnect and compute implementations, among other examples.

Figure 1B:
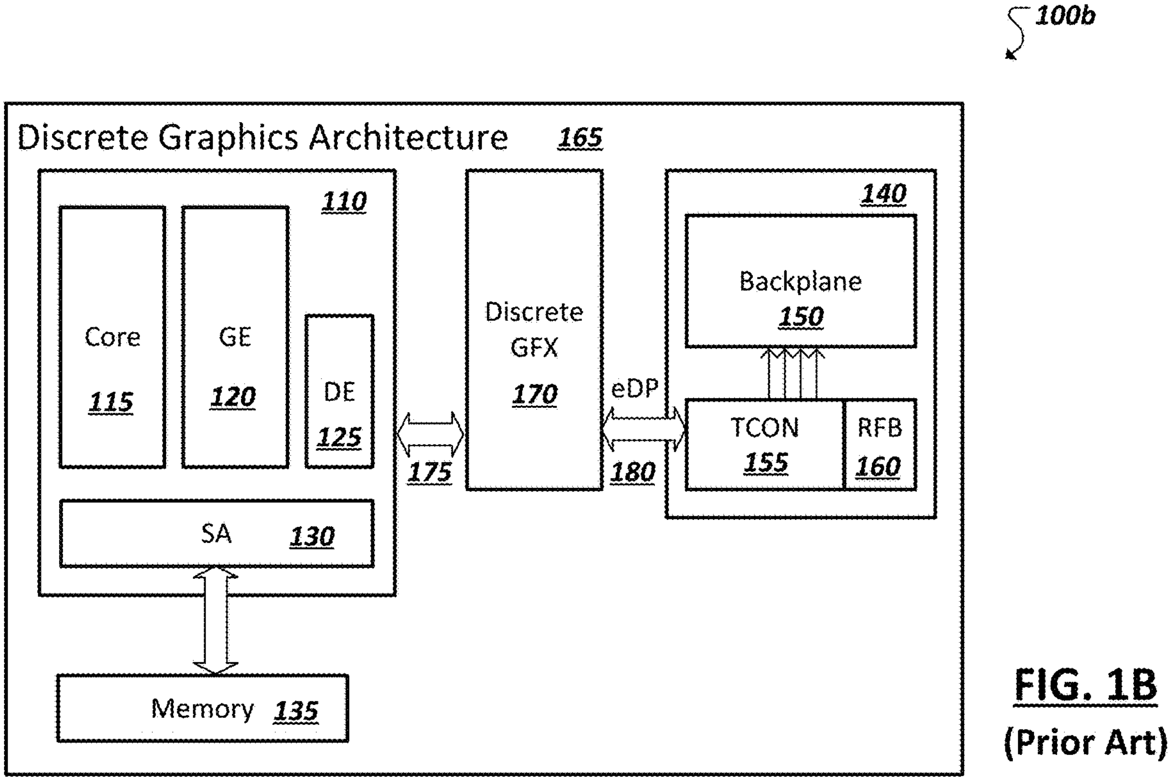
FIG. 1B (Prior Art)

Turning to FIGS. 1A-1B, simplified block diagrams 100*a-b* are shown illustrating examples of traditional graphics architectures. For instance, FIG. 1A illustrates an example internal graphics architecture. In this example, a computing system 105 includes a system on chip (SoC) 110 (or alternatively a board) implementing the main microprocessor system including one or more processing cores (e.g., 115), a graphics engine 120 (e.g., implemented as an integrated and/or discrete graphic processing unit), a display engine 125 (e.g., implemented as an integrated or discrete video display controller), among other example microprocessor components for use in implemented a graphics display, such as a system agent (e.g., 130) or uncore interfacing with memory 135 (e.g., random access memory (RAM)) and providing cache coherency, memory I/O, and other memory controller functions to, among other example functionality and components.

Continuing with the example microarchitecture of FIG. 1A, the main processing system (e.g., 110) may interface with a display 140 using display engine 125 over a communication interface 145, such as an eDP interface. The display 140 may include a backplane 150 upon which LEDs or LCD segments may be implemented to realize the display 140. One or more timing controller (TCON) circuits 155 (e.g., implemented on a TCON board or chip) may be provided that receives display data (generated by display engine 125 based on graphics data generated by graphics engine 120) and orchestrates signaling of LEDs or LCD segments on the backplane 150 to realize the presentation of the corresponding graphics on the display 140. A remote frame buffer (RFB) 160 and other components (e.g., a scaler working in conjunction with and supporting the TCON) may also be provided to convert data received over interface 145 to orchestrate the corresponding activation of LEDs or LCD segments of the display to realize the desired graphical presentation on the display.

Turning to FIG. 1B, an additional example architecture is illustrated of a system 165 utilizing discrete graphics circuitry 170 (e.g., implemented as a discrete graphics card). As with the example of FIG. 1A employing exclusively integrated graphics circuitry, the example system in FIG. 1B may include one or more processor cores (e.g., 115), a system agent 130, memory 135 and one or more interfaces (e.g., 175), for instance, to interface a discrete graphics card or chip 170. In some instances, the system 165 (e.g., SoC) may additionally include an integrated graphics engine (e.g., 120) and display engine (e.g., 125) in addition to the discrete graphics card 170. In some instances, the discrete graphics card 170 may operate as a subordinate system with its own independent memory (e.g., so as not to utilize system memory 135). An integrated graphics approach, such as shown in FIG. 1A, may be designed such that the graphics engine utilizes the system RAM. In the case of a discrete graphics architecture (in FIG. 1B), the graphics card 170 may interface directly with the display 140 (e.g., over interface 180), to provide dedicated functionality similar to or as an alternative to an integrated graphics engine (e.g., 120) and display engine (e.g., 125), among other functionality, including specialized graphics processing functionality (e.g., adapted to gaming, specialized media, or other applications), and other example features.

In the cases of both architectures shown in the examples of FIGS. 1A-1B, the core graphics processing and associated memory is positioned and implemented separate from the display (e.g., 140). For instance, in a laptop, the SoC (e.g., 110), memory (e.g., 135), and graphic processing is contained within the base of the laptop and connected (e.g., through an ePD or MIPI connection) to the display located in the lid. In traditional systems, the portion of the device used to implement the display mainly consist of the display itself, some sensors (e.g., a camera, microphone, and other sensors), and in some cases (optionally) antennae for wireless communications. In an improved system, discussed herein and facilitated through the adoption of micro display technology, new portioning of compute and memory used in generating graphics on a display may be implemented in both the base (e.g., SoC) and the display (e.g., contained in the lid or display portion of the device). For instance, microLED-based displays may enable one or both of memory, compute, and controllers (e.g., TCON or other control logic) to be embedded within the display (e.g., between LEDs in the display). Such a portioning may assist in more evenly spreading thermal dissipation across the device (e.g., in both the base and lid of a laptop or both sides of a smartphone or wearable), potentially pack more memory and processing into the device (at the display), and enable new and improved applications and interfaces capable of improving the overall functioning of the display and device as a whole, among other example advantages.

Figure 2:
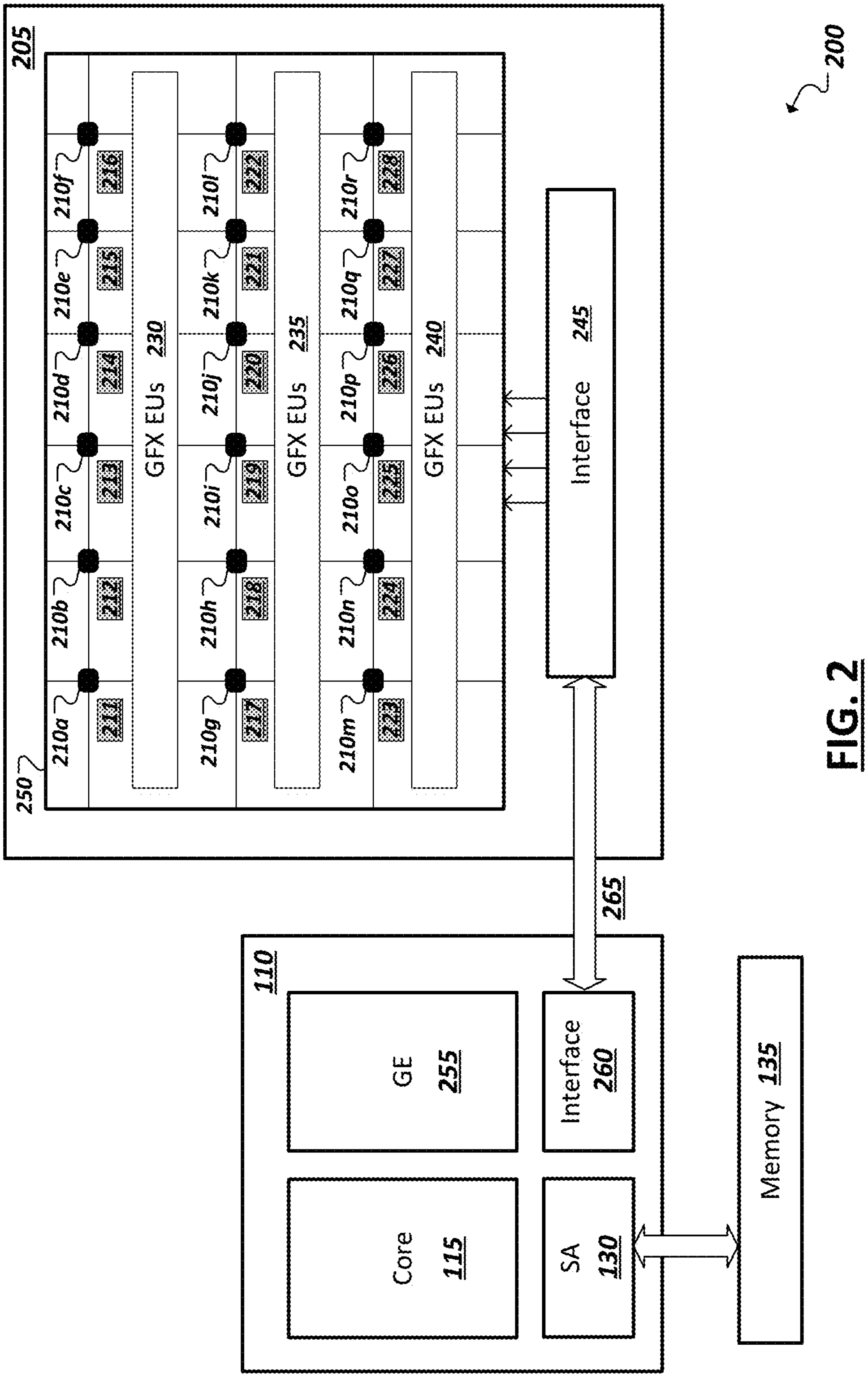
FIG. 2 is a simplified block diagram of an improved computer display architecture.

Turning to FIG. 2, a simplified block diagram 200 is shown illustrating an example implementation of an improved graphics architecture utilizing a display with microLEDs and embedded compute and memory. In some implementations, a conventional host processor (e.g., implemented in this example as an SoC device (e.g., 110)) may be utilized with an improved display device (e.g., 205), while in other implementations at least some of the logic of the host processor platform 110 may be augmented or otherwise tailored to maximize the efficiencies and features available through the improved display 205. In the example of FIG. 2, the host processor platform 110 may include one or more processor cores (e.g., 115), integrated or discrete graphics engines (e.g., 255), memory (e.g., 135), a system agent and/or memory controller to facilitate access to data in the memory by the host processor, graphics engine 255, and other processing elements in the processor platform 110, among other example features.

As introduced above, micro-displays allow significant per pixel available real estate, the amount of which is dependent on the size of sub-pixels (e.g., a red, green, or blue sub-pixel of the pixel) and the overall resolution of the display (e.g., the pixel pitch applied). Just as sub-pixels can be deposited onto a display backplane though a variety of micro-transfer processes, other intelligences can also be integrated into the LEDs implementing individual pixels or sub-pixels. Each LED element (e.g., 210*a-r*) may implement an entire pixel (e.g., providing both red, green, and blue LEDs) or a sub-pixel of the pixel. As shown in FIG. 2, a display 205 may be constructed that utilizes microLED elements (e.g., 210*a-r*) and which collocates or embeds other memory and compute elements (e.g., 211-228, 230, 235, 240, etc.) with or near (e.g., in the pitch between) the LED elements 210*a-r*, for instance, on the backplane 250 of the improved display 205. For instance, in-pixel memory may be implemented by providing memory elements (e.g., 211-228) on the backplane interspersed with the LED elements 210*a-r*. For instance, dedicated blocks of memory may be provided for each pixel implemented by corresponding LED elements 210*a-r*. In the example of FIG. 2, individual memory elements (e.g., 211-228) are shown to be located near corresponding LED elements (e.g., 210*a-r*) on a one-to-one basis. However, in other implementations, larger blocks of memory may be embedded between two or more LED elements which is accessible and include memory segments dedicated to a collection of LED elements (e.g., including both the LED elements closest to the memory element, as well as other nearby (e.g., adjacent) LED elements, among other examples.

Continuing with the example of FIG. 2, in addition to integrating in-pixel memory on the backplane 250 of a micro display 205, compute hardware circuitry may also be embedded on the backplane amongst the LED elements to distribute compute between both the host processor platform (e.g., 105) and the display 205 itself. For instance, in the example of FIG. 2, a set of execution unit (EU) circuitry (e.g., 230, 235, 240) may be embedded among the LED elements (e.g., 210*a-r*) to provide compute functionality relating to graphics processing and display operations for the display 205. For instance, a set of execution units (e.g., 230, 235, 240) may implement in-pixel graphics back-end processing and/or display engine backend processing, for instance, to provide functions such as gamma correction, color calibration, tone mapping, brightness control, pixel shading, fast inking (e.g., for stylus applications), etc. Such functions provided by the execution units may be at the LED element (or pixel level) or may be applied to groupings (e.g., subsets) of pixels, among other example implementations. With such functionality provided on-display and at the pixel-level, local in-pixel memory may be accessed and processed selectively and discriminately, on a pixel-by-pixel basis, reducing the complexity of and power required for such operations (which are conventionally applied concurrently for all elements on the display). Additionally, the use of redundant functionality provided through the integrated graphics and display engines of general-purpose computing platforms (e.g., 105) may be reduced or done away with entirely, based on the presence of such functionality at the display level. For instance, the use of such improved displays may consequently allow the design of host processor platforms and SoCs to be simplified, with simplified graphics processors (e.g., 255) and display interfaces (e.g., 260), among other example benefits. In still other examples, additional compute and control logic may be further integrated with the display and relocated from the host or the display bezel to between LEDs, such timing controller and scaler logic, among other example hardware.

In some implementations, through the providing of in-pixel memory and compute, such as shown in the example of FIG. 2, a simplified interface 265 may be provided over which the host processor platform 110 may communicate with the display 205. For instance, the on-display interface 245 may couple to interface 260 of the host processor 110. The on-display interface may facilitate pixel addressable signaling, based on display or frame data received from the host processor 110 over interface 265. In some implementations, multiple controller elements may be provided on the display to correspond to subsets of pixels on the display, and interface 245 may serve to route instructions, messages, or other signals to individual controllers to signal individual LED elements corresponding to individual pixels or sub-pixels.

In general, “processors,” “processor complexes”, “systems on chip”, “servers,” “clients,” “computing devices,” “network elements,” “hosts,” “platforms”, “compute elements”, “sensor devices,” and “systems”, etc. in example computing environments (such as shown and discussed in FIGS. 1-2), can include electronic computing devices operable to receive, transmit, process, store, or manage data and information associated with the computing environment. As used in this document, the term “computer,” “processor,” “processor device,” or “processing device” is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux™, UNIX™, Microsoft™ Windows™, MacOS™, Apple™ iOS™, Google™ Android™, Google™ Chrome™, Windows Server™, etc., as well as virtual machines adapted to virtualize execution of a particular operating system, including customized and proprietary operating systems.

While systems illustrated in the figures may be described as containing or being associated with a plurality of elements, not all elements illustrated may be utilized in each alternative implementation of the present disclosure. Additionally, one or more of the elements described in connection with the examples herein may be located external to the computing environments illustrated, while in other instances, certain elements may be included within or as a portion of one or more of the other described elements, as well as other elements not described in the illustrated implementation. Further, certain elements illustrated may be combined with other components, as well as used for alternative or additional purposes in addition to those purposes described herein.

Figure 3:
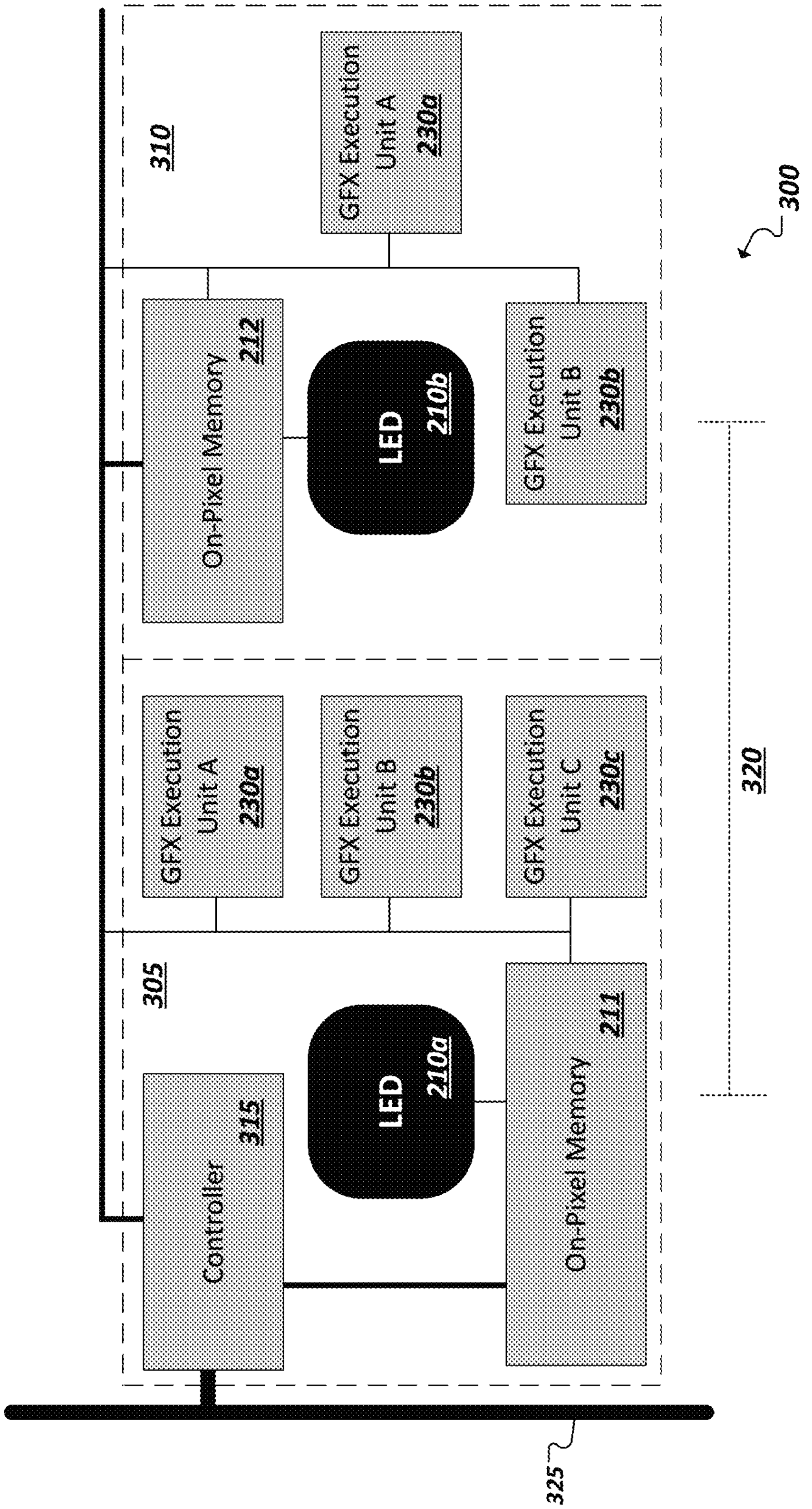
FIG. 3 is a simplified block diagram illustrating a portion of an array of light emitting diodes (LEDs) and in-pixel memory of an example computer display.

With reference now to FIG. 3, a simplified block diagram 300 is shown illustrating a portion of an example display including compute and memory elements embedded with LED elements on a backplane or other substrate of the display. For instance, a substrate of the display, whereon the microLED elements (e.g., 210*a-b*) are to be mounted or grown may have an overall area, with respective subareas (e.g., 305) corresponding to each pixel to be implemented in the display. An LED element (e.g., 210*a-b*) may be one of a set of one or more LED elements utilized to implement the pixel (and/or component subpixels) corresponding to a subarea. Based on the size and resolution of the display to be implemented, a respective pitch 320 may define a distance between neighboring LED elements (e.g., 210*a-b*) implementing neighboring pixels. The pitch, in a sense, may also quantify a dimension of real estate (e.g., semiconductor substrate) available for integration or mounting of additional elements, such as introduced above. For instance, a respective memory element (e.g., 211, 212) may be provided as in-pixel memory for a corresponding pixel in the display, with the memory element 211-212 located at or near the corresponding LED element(s) implementing the pixel. Further, a respective instance of one or more execution units (e.g., 230*a-b*) may be provided for each one of the pixels to perform graphics or display functions utilizing pixel-specific data stored in corresponding in-pixel memory. In some cases, such as shown in the example of FIG. 3, memory and/or compute elements (e.g., 230*c*, 315) may be located in less than all of the subareas associated with pixels in the display, for instance, based on special functionality (e.g., touch) to be equipped in association with only a subset of the pixels or to contain logic elements that provide functionality for multiple pixels in the display. As an example, various controller circuitry blocks (e.g., 315) may be provided to assist in directing specific signals (based on received frame data generated by an associated SoC) to specific LED elements associated with a pixel using an interconnect 325. For instance, a particular controller (e.g., 315) may be connected to and orchestrate signaling to individual pixels within a defined subset of pixels (e.g., a row, column, or 2D subarea of pixels) of the display, among other examples.

By integrating in-pixel memory and compute for pixel backend processing on the display, such as shown in the example of FIG. 3, the in-pixel memory may be leveraged to store and retain the corresponding pixel values indefinitely without any need for self-refresh. Such features allow a reduction in both the display (and corresponding processing) power, as well as timing control complexity. For instance, rather than refreshing all pixels in the display, as in conventional displays, any pixels that do not change value from one frame to the next may not need to be signaled or refreshed, instead utilizing the pixel value stored in corresponding in-pixel memory to retain the value from one frame to the next. In addition, in-pixel memory may be accessed by pixel-level compute (e.g., 230*a-c*) to provide offloading of display engine backend processing like gamma correction, color calibration/correction, as well as frame level pixel backend processing for applications (e.g., games) directly on the display, thereby enabling processing and thermal load to be spread over both the base and lid/display of the device. As another example, high dynamic range (HDR) tone mapping can be offloaded to compute elements (e.g., 230*a-c*) in the micro display, among other example features. Generally, localizing at least some of the graphics compute in the display may reserve more platform compute power for other graphics or non-graphics processing, as well as preserve additional (e.g., 10-15 W) power budget and provide per pixel power management (e.g., through retaining pixel values using in-pixel memory). Further, since a pixel may utilize the in-pixel memory to retain its state indefinitely, the display interface can be non-isochronous, and pixel addressable. A corresponding low power high-speed interface (e.g., using optical, radio frequency, or other communication technology) can be used to connect the display to the host processor platform, among other example advantages.

A variety of techniques may be employed to embed memory and/or compute elements with LED elements on a substrate of a display (e.g., the backplane). In some implementations, each element (e.g., LED, memory, compute, etc.) or some of the elements may be embedded through "pick and place" techniques. In some implementations, an LED element may be manufactured as an element with embedded memory and/or compute (e.g., on the same wafer), with the integrated element being then added to the display backplane through pick and place or another technique. In still other examples, the backplane or substrate may be manufactured to integrate memory and/or compute circuitry, with the LED elements later added, or vice versa with the LED elements grown on the substrate and memory and/or compute elements later added to correspond to the individual LED elements, among other example techniques, including combinations and subcombinations of the techniques introduced above. Further, while FIG. 3 illustrates the subareas (e.g., 305, 310) corresponding to individual pixels as being discrete subareas neatly forming a perimeter around memory and compute elements (e.g., 211, 212, 230*a-c*, 315, etc.) associated with a corresponding pixel, in practice, such boundaries may not exist, with some memory and/or compute elements spanning multiple sub-areas, including sub-areas associated with pixels not served by the memory or compute element, among other examples.

As introduced above, an improved micro display architecture, which embeds in-pixel memory and/or in-pixel compute with microLEDs on the display substrate may enable a variety of new and improved applications, designs, and features. For instance, the improved display may include and make use of a non-isochronous high-speed display interface permitting access to individual pixels, thereby improving power and efficiency of the display's performance. In some implementations, rather than using a conventional TCON module, control circuitry of the improved display may be simplified relative to convention TCONs by integrating the RFB on a per pixel basis in to display, thereby assisting in reducing panel electronics board size and in effect the bezel size. Further, per pixel power management may be implemented thus reducing overall display power consumption (e.g., by limiting signaling and display-wide frame refresh, by instead maintaining pixel state across frames, when no changes are needed at the pixel (and maintaining pixel state through in-pixel memory)). Additionally, distributing memory and compute (and corresponding I/O traffic) at the display may assist in distributing power and thermal loads across the system and even offloading some display-related workload from the platform processor, freeing up processing bandwidth for other system workloads. Such distribution may enable thinner, more powerful (and/or more battery friendly) devices, among other example improvements.

Figure 4:
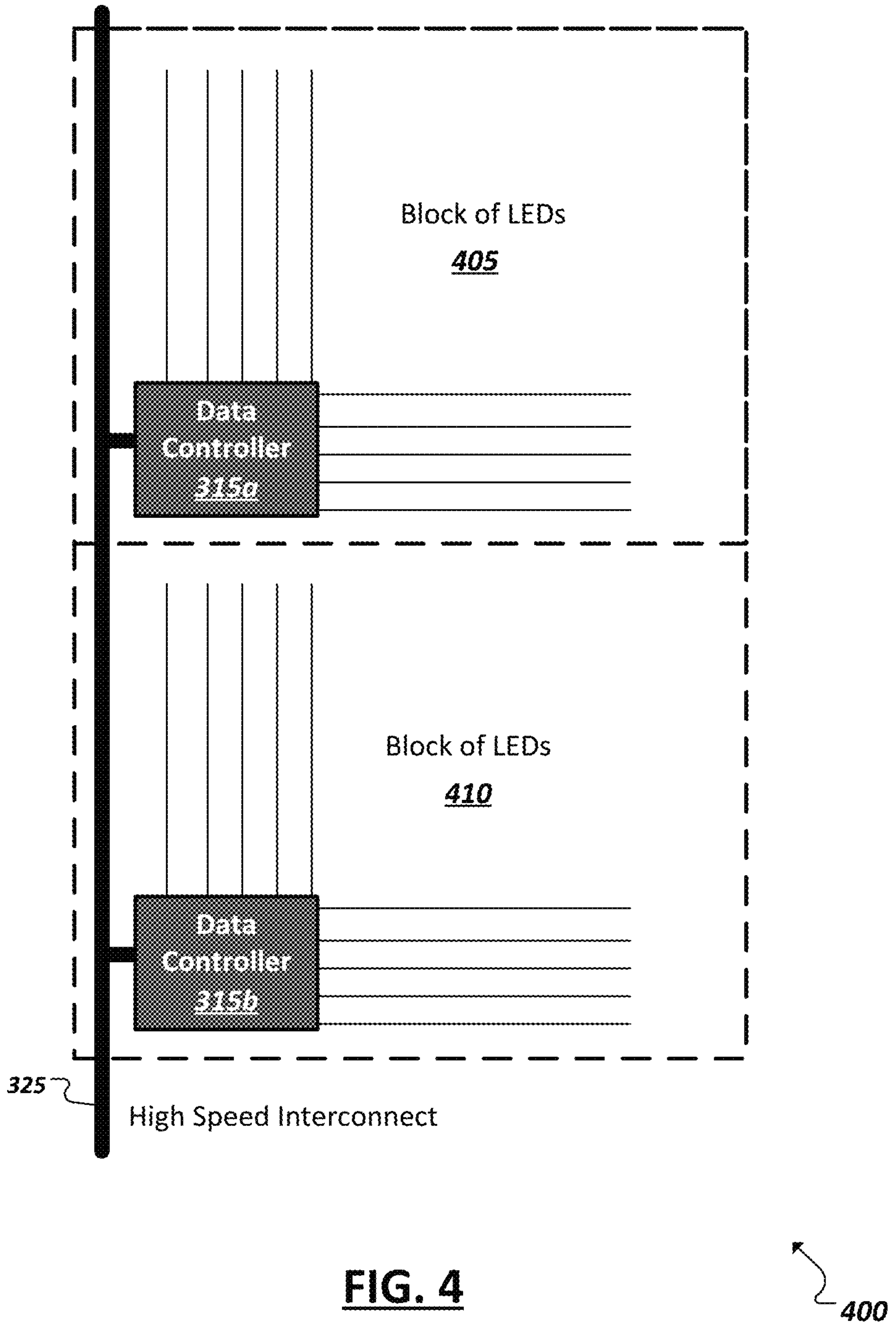
FIG. 4 is a simplified block diagram illustrating a portion of an interconnect and controllers within an example computer display.

FIG. 4 is a simplified block diagram illustrating an example interconnect 325 interfacing with controllers (e.g., 315*a*-315*b*), each responsible for controlling respective blocks, or subsets, of LEDs (e.g., 405, 410) in the display. A high-speed interconnect may be utilized to route messages from the host processor platform to the controllers (e.g., 315*a*-*b*) on the display. In some cases, data controllers may be embedded with LED elements, in that they are positioned in "free" substrate space between LEDs. While in traditional systems, timing controllers serve as display controllers converting video signals to timing signals to orchestrate display elements in a row- or column-wise manner, controllers (e.g., 315*a*-*b*) may instead function more like a memory controller, interfacing with in-pixel memories of individual LED elements or pixels (which may be implemented by a set of LED elements) to write new values to a given in-pixel memory when the corresponding pixel is to change in appearance. A controller (e.g., 315*a*-*b*), in some implementations, may additionally send messages to individual in-pixel execution units to cause one or more graphic or display functions to be performed at the pixel. In some cases, a controller may determine, for a given frame, that multiple signals are to be sent to multiple pixels (in-pixel memories and execution units) in the group of pixels for which the controller is responsible for controlling, although the signaling is performed in a pixel-addressed manner. Commands may also be sent from a controller (e.g., 315) to in-pixel compute elements (e.g., execution units 230*a*-*c*) using the same or a different interconnect to cause various operations to performed in connection with the display at corresponding pixels. As an example, commands may be routed from a host processor platform to the controller (e.g. 315) to cause a particular graphics operation (e.g., pixel shading) to be performed using in-pixel compute elements (rather than on-host compute). In some implementations, additional controllers or interface logic may be provided on the display, which may be responsible for processing traditional display data received from a convention computing platform and determining, which if any pixel values are to change in the display based on the display data. The interface controller may then communicate to respective controllers responsible for writing pixel values to individual in-pixel memory elements (e.g., to corresponding with scanning of pixels in a frame) to cause individual writes to occur to cause the display to generate the corresponding graphics from the collection of in-pixel memory elements, among other example implementations.

In some implementations, controllers provided in an improved display utilizing in-pixel memory to dictate individual pixel values and when these values should change (based on writes to these memory elements) may be comparatively simplified relative to traditional timing controllers and scaler controllers in conventional displays. For instance, a remote frame buffer (RFB) may be omitted from controller logic of the improved display (e.g., with in-pixel memory replacing the traditional frame buffer and RFB, etc.). Pixel-wise addressing may be performed, resulting in only a subset (and in some cases a very small subset) of in-pixel memory being signaled based on those pixels changing state. In some cases, the computing platform (e.g., SoC) generating the display data may be adapted to operate efficiently with such display architectures, sending display data that identifies (e.g., by coordinates) those pixels which are to have their respective in-pixel memory element overwritten to reflect the new, updated pixel value, among other example implementations.

Figure 5A:
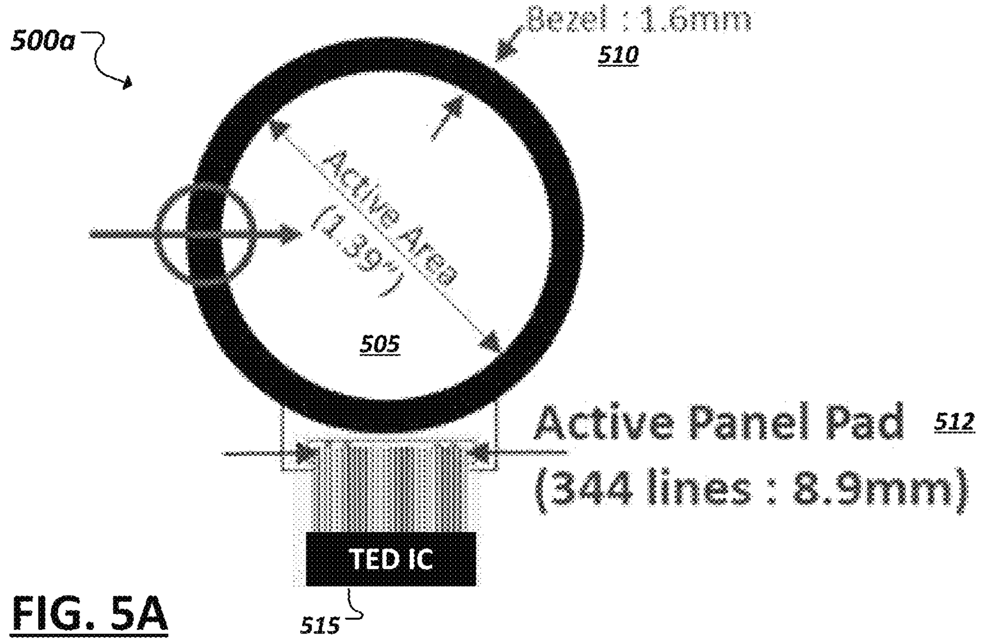
FIGS. 5A-5B are diagrams illustrating a comparison of the respective active area and bezels of conventional and improved LED displays.
Figure 5B:
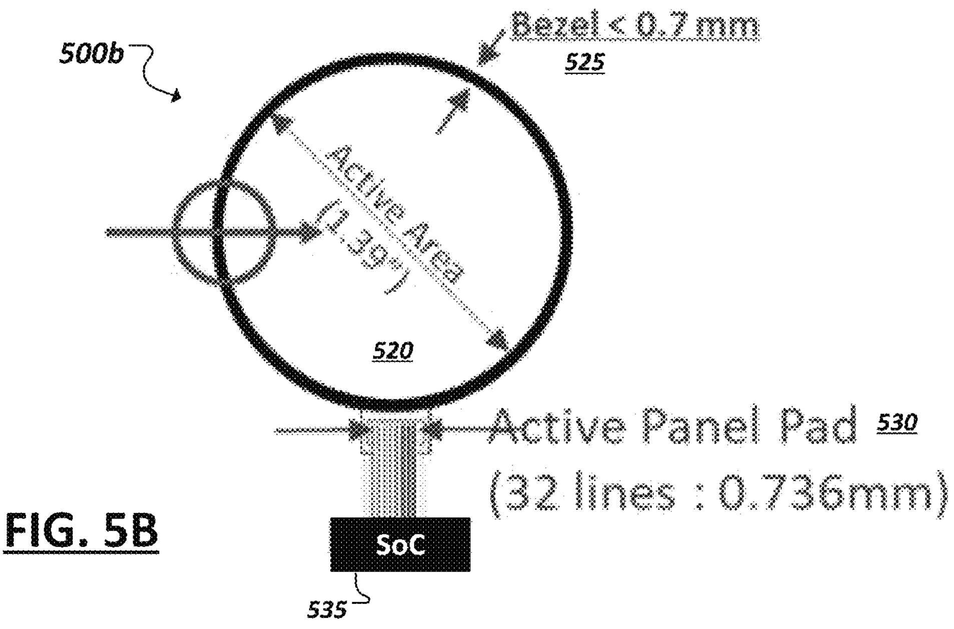

The high-speed interconnect utilized to provide connectivity between the computing platform and the display may be implemented as an optical, electrical, or radio frequency communication channel. As noted above, controllers utilized to signal individual LEDs in an improved display may similarly enable a simplified interconnect (relative to traditional interconnects supporting frame-based signaling and display control). Additionally, by locating controller circuitry within the display (e.g., between individual LED elements) and not outside the active area of the display, as is common in convention displays, a truly bezel-less display may be realized. For instance, a controller for delivering data to in-pixel may be embedded (like the in-pixel memory) in the display, driving LED element according to a specific bus/protocol defined to connect the display to the host platform. Turning to FIGS. 5A-5B, a traditional LED display is compared with an improved microLED-based display, such as discussed herein. In FIG. 5A, a block diagram 500*a* representing a traditional LED display is shown, with the display realizing a particular active area 505, with a resulting bezel width 510. The bezel 510 may be at least partially based on the width of the in-display interconnect 512 utilized, which is driven by the manner in which individual LED elements are driven by the controllers (e.g., TCONs) on the display. In this example, 344 lines (resulting in 8.9 mm of bezel width) are utilized to connect a TED chip 515 to the LED elements in the active display area 505. By way of comparison, FIG. 5B is a simplified block diagram illustrating an example of a microLED display with in-pixel memory used to drive the values of the individual LED elements. This example display has the same active area 520 as that (505) in the example of FIG. 5A, but realizes a substantially smaller bezel 525 width (e.g., less than 0.7 mm) than the example conventional display illustrated in FIG. 5A. This may be facilitated through the simplified control mechanisms in the example of FIG. 5B, enabling a simpler and narrower interconnect (e.g., 530) employed to couple the display to the corresponding computing platform (e.g., SoC 535). For instance, the width of the interconnect may be reduced relative to traditional implementations, as the parallel driver for each pixel (as in conventional TED drivers) may be omitted, and instead replaced with in-pixel control/memory through a high-speed serial interface, among other example features and implementations.

Figure 6A:
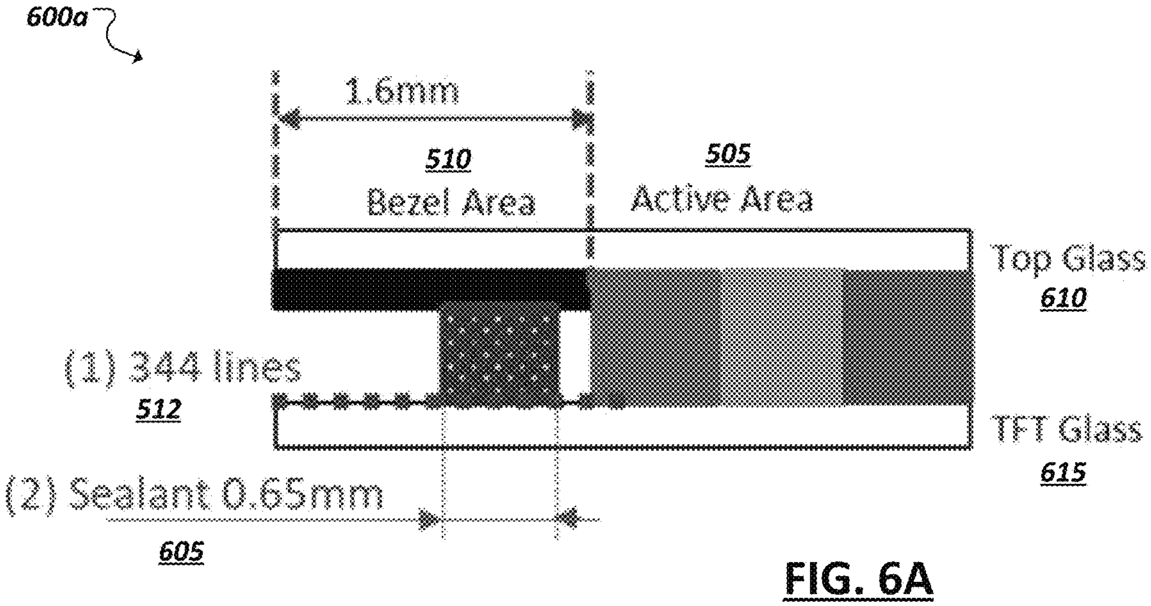
FIGS. 6A-6B are diagrams illustrating side view of example LED displays to show a comparison of the respective active area and bezels of conventional and improved LED displays.
Figure 6B:
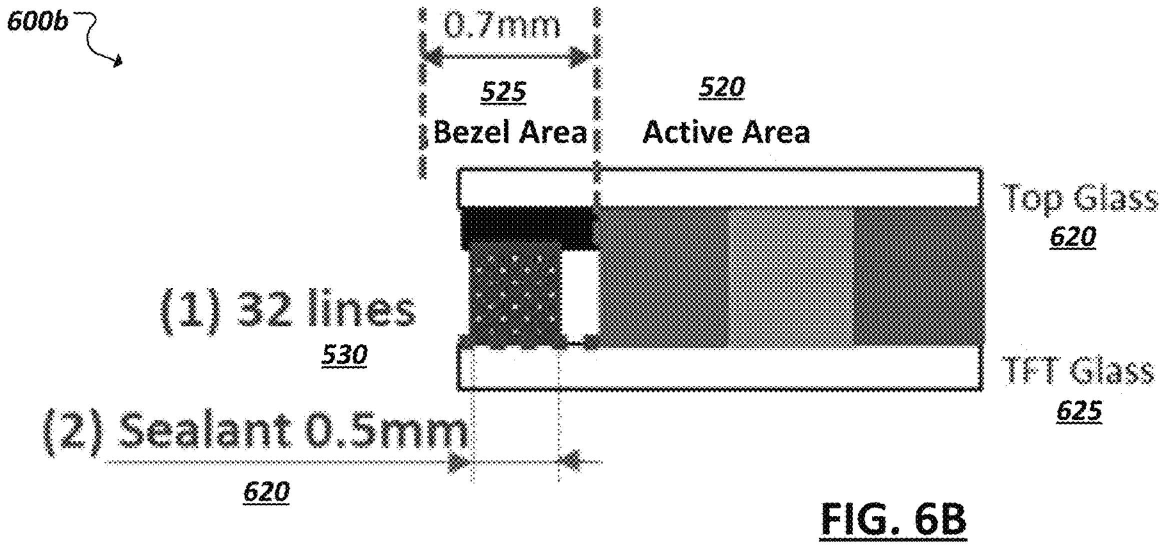

Turning to FIGS. 6A-6B, in addition to a narrower interconnect assisting in facilitating a narrower bezel in improved micro display architectures, in comparison with organic LED (OLED) implementations, the bezel of a micro display utilizing inorganic LEDs (e.g., microLED) technology may enable further improvements in bezel width (e.g., 510 vs. 525). For instance, FIG. 6A is a simplified block diagram 600*a* showing a cross-sectional side view of a section of a traditional OLED display. OLED elements in the active area 520 may be positioned between a substrate 615 (e.g., thin film transistor (TFT) substrate) and the top glass 610 of the display, with the bezel area based on the width of the interconnect 512 and the sealant 605 utilized to encapsulate the OLED elements. Given that microLED elements, unlike OLED elements, do not need thin film encapsulation, pixels in an improved microLED implementation may drive pixels right at the edge of the display leading to thinner bezel design. Accordingly, as shown in the cross-sectional view 600*b* of FIG. 6B, in addition to thinner interconnect footprint, thinner sealant 620 (e.g., to attach the top glass 625 to the substrate 630) may further contribute to a narrower bezel 525 than in traditional displays, among other example advantages.

Figure 7A:
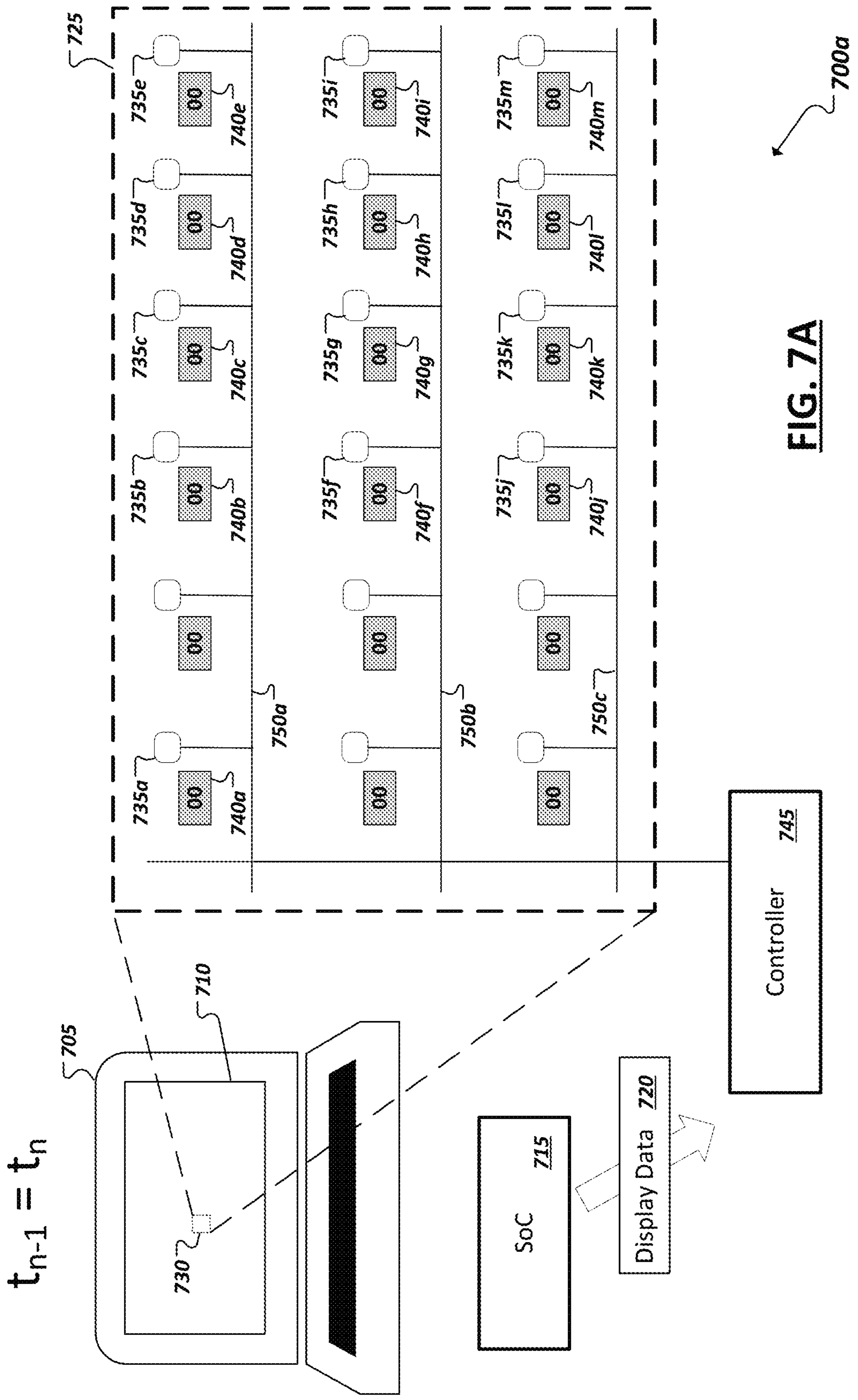
FIGS. 7A-7B are simplified block diagrams illustrating updating of pixels in a display in accordance with at least one embodiment.
Figure 7B:
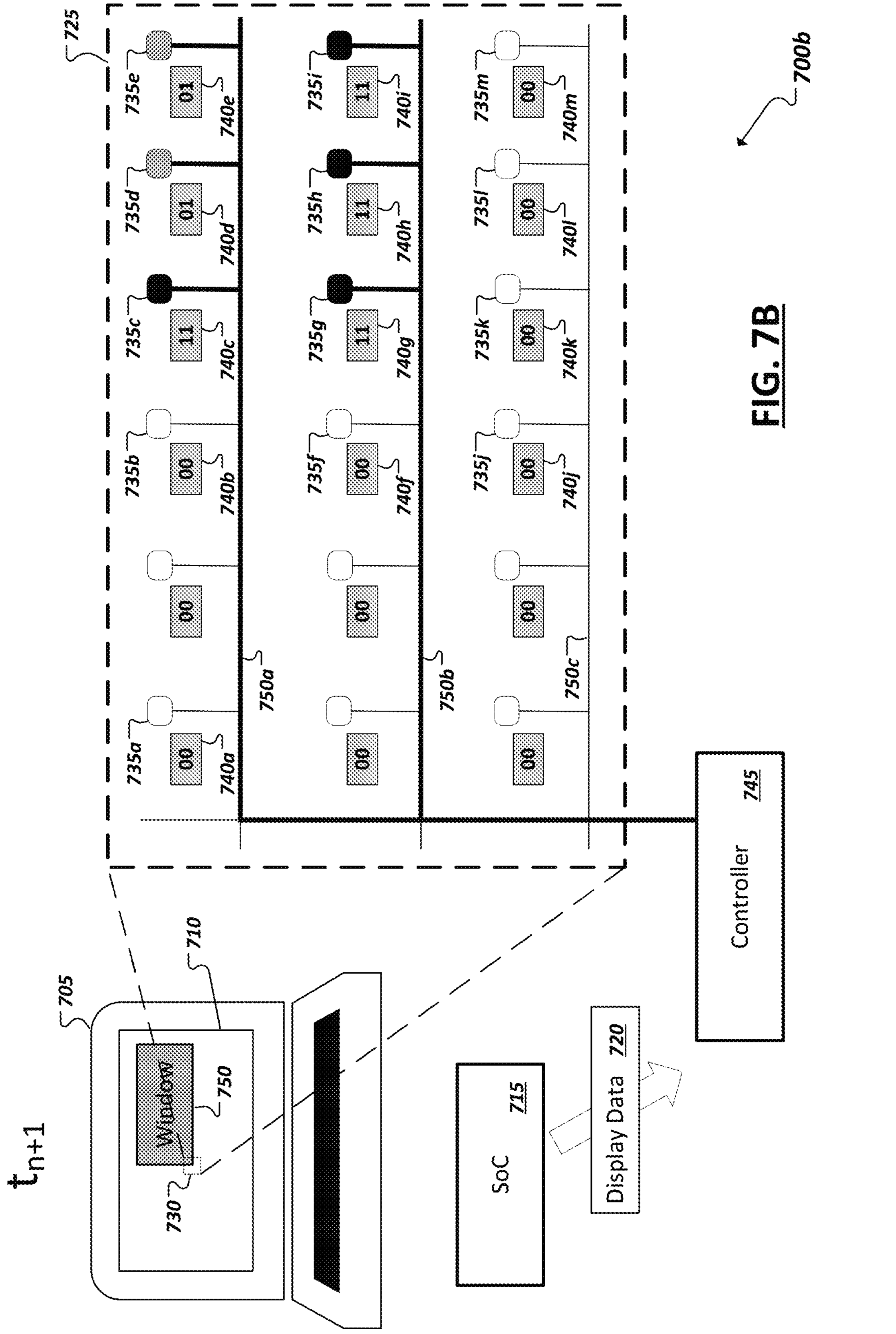

FIGS. 7A-7B illustrate an example of simplified operation of a micro display leveraging in-pixel memory to drive microLED elements in the display. FIG. 7A is a simplified block diagram 700*a* illustrating a computing device 705 with a display 710. The host processor platform 715 may generate graphics and/or display data 720 in the form of frames or other information to communicate a particular graphic presentation to be displayed on the display 710 at a given moment in time t. In this example, a magnified view 725 of (at least a portion of) subarea 730 of the display 710 is shown, the magnified view 725 showing the individual LED elements (e.g., 735*a-m*) within the subarea 730, together with the respective in-pixel memory elements (e.g., 740*a-m*) corresponding to the pixels/sub-pixels implemented using the LED elements.

In the example of FIG. 7A, the same graphics are to be displayed on the display 710 at both $t_{n-1}$ and $t_n$. In one example, the host processor platform 715 generates display data (e.g., 720) for a frame representing the graphics to be presented at $t_n$. A controller 745 at the display 710 may determine, from the display data, that there is no change in the graphics to be displayed at $t_n$ verses what was displayed at $t_{n-1}$. In this example, the corresponding in-pixel memory (e.g., 740*a-m*) stores a pixel value for each one of the pixels implemented using LED elements (e.g., 735*a-m*). As represented in this example, LED elements may embody one or a grouping of LEDs (e.g., red, green, and blue LEDs) to implement the corresponding pixel (or sub-pixels thereof). As the value (e.g., "00") stored in each of the in-pixel memory from the presentation at $t_{n-1}$ also represents the pixel value for the LED elements at $t_n$, the controller 745 does not communicate any data on connections (e.g., 750*a-c*) coupling the controller 745 to LED elements (e.g., 735*a-m*) controlled by the controller 745. Further, no change occurs at the individual LED elements 735*a-m* as their operation is driven by the value(s) stored in their corresponding in-pixel memory elements 740*a-m* and held static from one frame (at $t_{n-1}$) to the next (at $t_n$).

Turning to FIG. 7B and continuing with the example above, at time $t_{n+1}$ another frame's worth of display data (e.g., 720) is generated by and received from the host processor platform 715 (e.g., implemented as a SoC), for instance, over a high-speed interconnect. In this example, the display data 720 reflects that the display 710 is to be updated to reflect the presentation of a pop-up window (e.g., 750) within the active area of the display 710. Further, the controller (e.g., 745) at the display 710 may determine, from the display data 720, a delta between what was displayed at individual pixels (managed by the controller 745) at $t_n$ verses what is to be now displayed at $t_{n+1}$. The controller 745 may specifically signal only those LED elements (e.g., 735*c-e*, 735*g-i*) whose pixel value is to be changed based on the display data. For instance, the controller 745 may send signals over connections (e.g., 750*a-b*) associated with these changing pixels to cause pixel values stored in the pixels' corresponding in-pixel memory elements (e.g., 740*c-e*, 740*g-i*) to be overwritten with values to reflect the new pixel values. In this example, based on the new pixel values written to in-pixel memory elements (e.g., 740*c-e*, 740*g-i*), the corresponding LED elements 735*c-e*, 735*g-l* may be driven to change their presentation (e.g., color) consistent with the pixel values newly stored in their in-pixel memory elements. Other pixels (e.g., 735*a, b, f, j-m*) may be determined to hold their pixel values from the previous frame(s) (e.g., at $t_n$). Accordingly, the controller 745 may refrain from communicating any information to these LED elements allowing these LED elements instead to simply hold state based on the respective pixel values previously written to their corresponding in-pixel memories (e.g., 740*a, b, f, j-m*). In this manner, signaling and state changes of individual pixels may be effectively filtered to address only those pixels with changing values. As large portions of LED elements may remain static from frame-to-frame in some computing applications, such conservatism implemented in the display architecture may yield substantial power and efficiency benefits. Further, in implementations where graphics and display functions are also offloaded to in-pixel execution units (such as discussed above), such local compute may simply access and operate upon the values stored in in in-pixel memory, further offloading compute and memory I/O workload from the host processor platform (e.g., 715) to the display 710.

In some implementations, display data generated by the host processor platform (e.g., 715) may be in a legacy format, assuming the display operates as a conventional display refreshing rows (or columns) on a frame-by-frame basis. Such display data may be converted at the display (e.g., utilizing an on-glass TCON) to enable pixel-wise, memory-centric pixel updates, such as discussed in the examples above. In other implementations, a host processor platform (e.g., 715) may implement an interface adapted to efficiently operate with an improved micro-display with in-pixel memory addressing. For instance, display data 720 generated by the host platform may be simplified, identifying pixel-wise changes from frame to frame, rather than the entirety of the frame (identifying values for each and every pixel), among other examples. Further, in implementations with on-display compute (e.g., implemented through in-pixel backend processing capabilities), the host platform may omit or disable redundant graphics engine and/or display engine capabilities of the host platform (e.g., 715) and, in some cases, utilize the interface with the display's controllers (e.g., 745) to initiate execution of in-pixel operations using local EUs embedded among the LED elements on the display, among other examples. In some implementations, in-pixel EUs may be leveraged to realize enhanced solutions, such as performing video codecs/graphics as fixed functions on the in-pixel execution units (e.g., allowing a streaming video to be decoded directly at the display), among other example applications and use cases.

Figure 8:
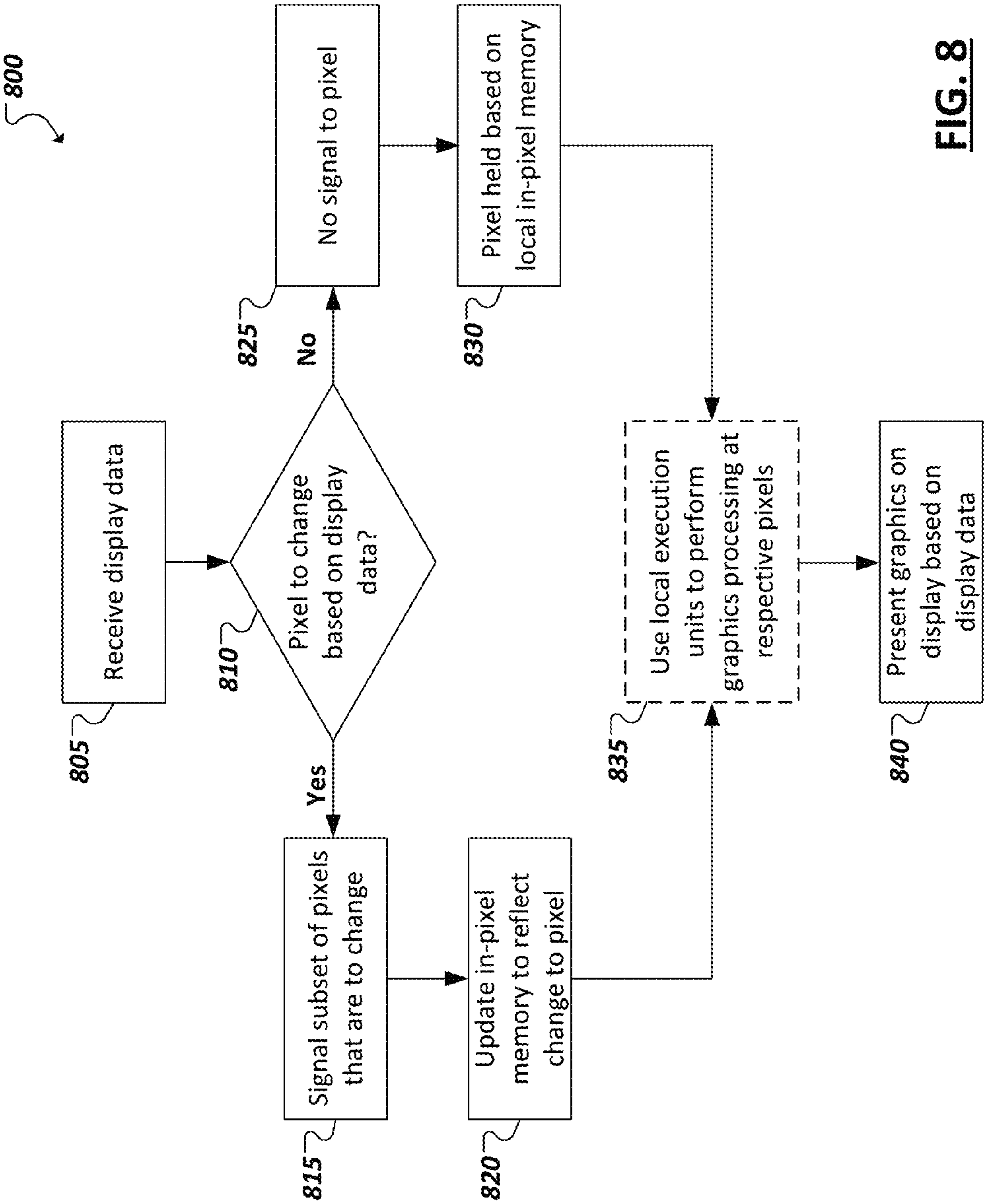
FIG. 8 is a flowchart of an example technique for updating graphics in a display in accordance with at least one embodiment.

FIG. 8 is a flowchart 800 illustrating an example technique for presenting graphics on a micro display, where the micro display includes an array of pixels generated using a collection of microLED units. Display data may be received 805, which may originate from graphics data generated at a host processor platform separate from the display. The host processor platform may include its own general-purpose processor, graphics processor, and memory, among other components. The display data may be generated using a controller at the display to convert legacy graphics or display data into a format consumable by the display and its controllers and interface. Alternatively, the host processor platform may generate the display data according to a format and interface between the host processor platform and the display. The display data may be based on a transition from a first frame to a second frame in the graphics to be presented on the display determined at the host processor platform (e.g., based on a keyboard or mouse entry, presentation of video frames in a video file, the opening of a new window, a user toggling between existing windows, etc.).

From the display data, the display (e.g., a controller implemented on the display) may determine 810 which, if any, pixels are to be changed between the preceding first frame and the immediately succeeding second frame. For each pixel that is to be changed from its preceding pixel value (in the first frame) to a new pixel value (in the second frame), a controller at the display may communicate a message or other signal 815 to logic associated with each respective pixel (and the microLED element(s) implementing the pixel) to cause the pixel value to be changed. In one implementation, in-pixel memory may be provided for each pixel in the array. Specifically, the signal 815 may cause a pixel value stored in in-pixel memory associated with the corresponding pixel to be updated 820 to reflect the new pixel value. The in-pixel memory may be collocated with the corresponding LED element(s) implementing the pixel to be positioned between the corresponding LED element and LED elements implementing a neighboring pixel. The illumination of each one of the LED element(s) may be at least partially driven (or controlled) based on the pixel value stored in the corresponding in-pixel memory. Accordingly, changing the in-pixel memory for a pixel causes the presentation of the pixel to change consistent with the pixel value written to the in-pixel memory. The pixel may remain in this pixel state as long as the in-pixel memory stores this pixel value, even across transitions in frames (if the pixel is not to change in the frame transition). For instance, for pixels determined not to change value in the transition from the first frame to the second frame, no signal 825 will be sent, as the pixel value stored in corresponding in-pixel memory may be allowed to remain held 830 untouched and continue driving the presentation of the corresponding pixel (using corresponding LED elements utilizing the in-pixel memory for control). In some implementations, the display may additional include local in-pixel execution unit circuitry (also mounted on the backplane with the LED elements and in-pixel memory elements) to provide in-pixel backend processing and graphics functions at the corresponding LED elements. Indeed, the in-pixel execution units may utilize data stored in corresponding in-pixel memory to perform graphics processing and further cause the display to present 840 graphics on the display based on the display data (e.g., reflecting the second frame determined by the host processor platform), among other example implementations.

Figure 9:
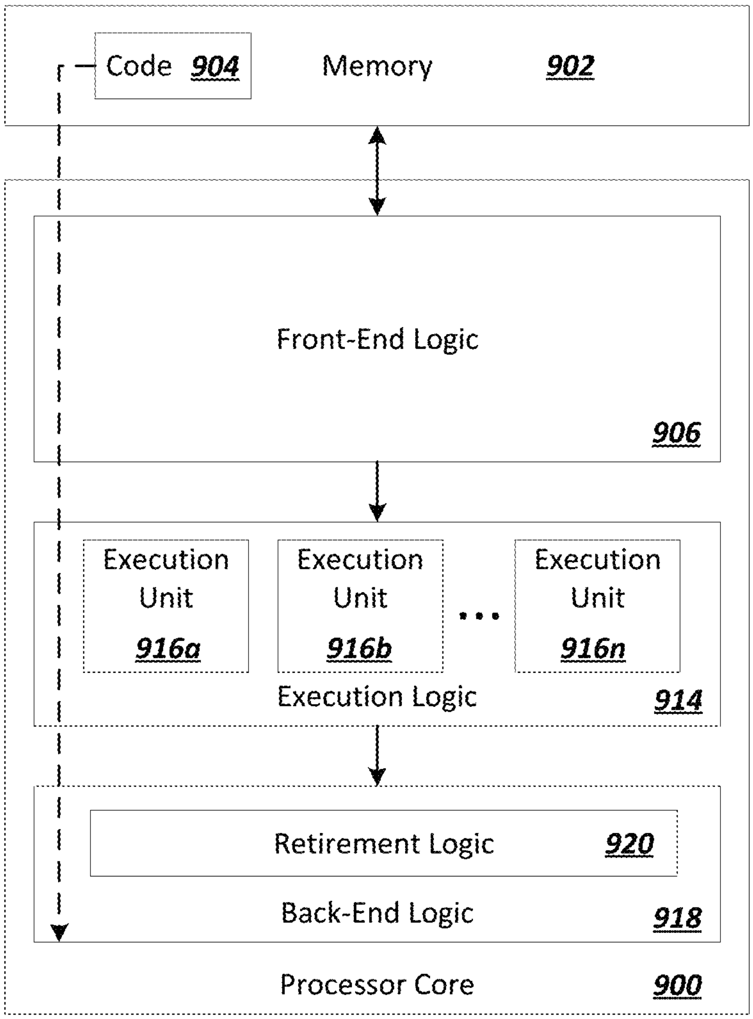
FIG. 9 is a block diagram of an exemplary processor in accordance with one embodiment.
Figure 10:
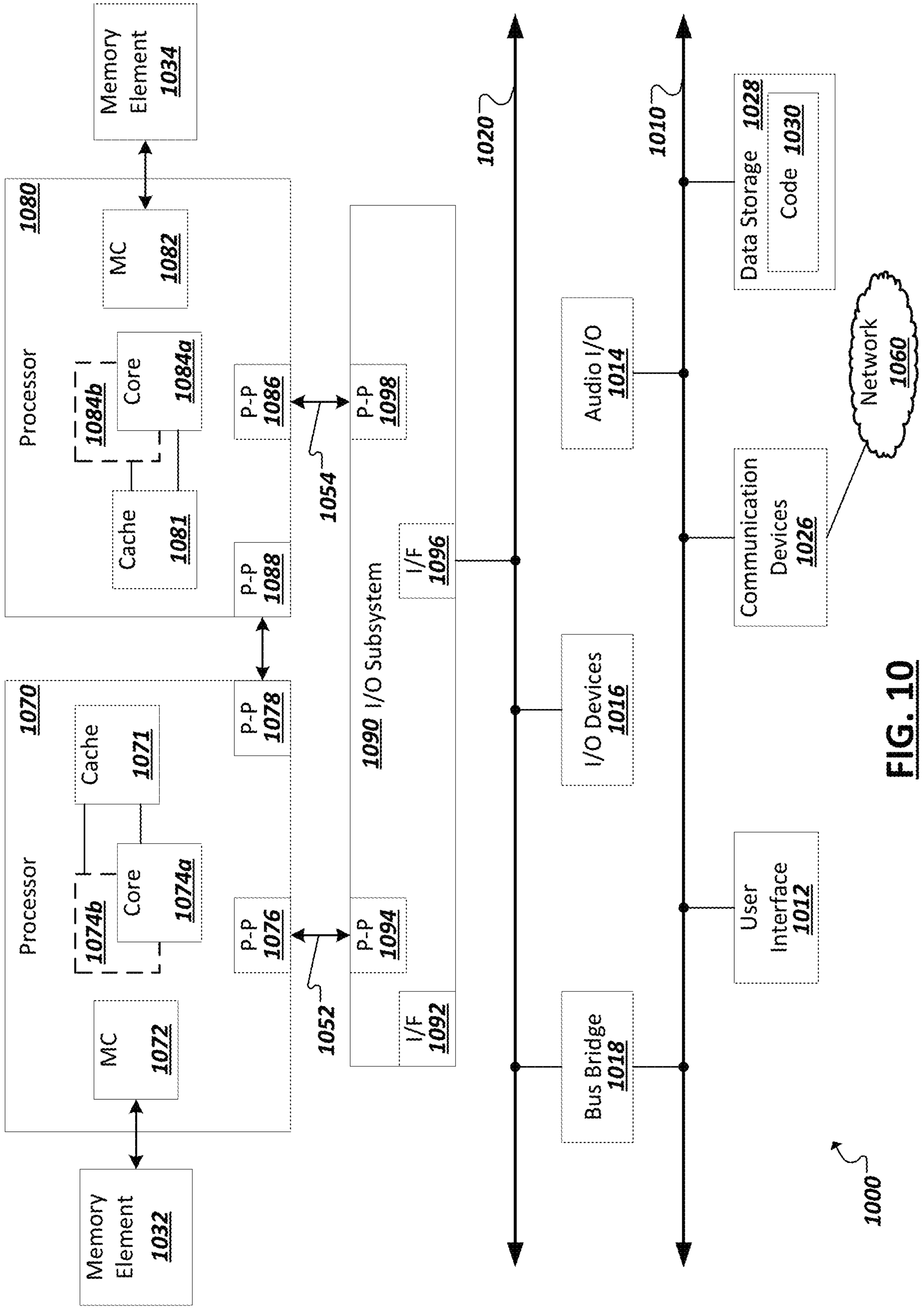
FIG. 10 is a block diagram of an exemplary computing system in accordance with one embodiment.

FIGS. 9-10 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916*a*, 916*b*, 916*n*, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 900.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a co-processor 1038, such as a high-performance graphics circuit, machine learning accelerator, or other co-processor 1038, via an interface 1039, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is an apparatus including: a portion of a backplane, where the portion is associated with a particular pixel of a display, and the display is to include an array of pixels; a particular light emitting diode (LED) on the portion of the backplane, where the particular LED is to implement the particular pixel; and local memory located with the particular LED on the portion of the backplane, where the local memory is to store data to be used to control the particular LED and presentation at the particular pixel.

Example 2 may include the subject matter of example 1, further including execution unit circuitry to perform one or more graphics operations for the particular pixel using data stored in the local memory, where the execution unit circuitry is located with the particular LED and the local memory on the portion of the backplane.

Example 3 may include the subject matter of example 2, where the one or more graphics operations include at least one of gamma correction, color calibration, or tone mapping at the particular pixel.

Example 4 may include the subject matter of any one of examples 1-3, further including controller circuitry to send a signal to control presentation of the particular pixel based on display data, where the signal is to cause data to be stored in the local memory based on the display data.

Example 5 may include the subject matter of example 4, where the controller circuitry is located with the particular LED on the portion of the backplane.

Example 6 may include the subject matter of any one of examples 4-5, where the data is to be stored in the local memory to reflect a change in pixel state for the particular pixel based on the display data, and the data overwrites other data associated with a previous pixel state.

Example 7 may include the subject matter of example 6, where the pixel state of the particular pixel is to remain unchanged based on other display data, the controller circuitry refrains from signaling the particular LED based on the other display data, and illumination of the particular LED remains static in response to the other display data based on the data stored in the local memory.

Example 8 may include the subject matter of any one of examples 4-7, where the particular LED is one of a plurality of LEDs in the array of pixels, and the apparatus further includes a plurality of controllers, where each of the plurality of controllers controls a respective subset of the plurality of LEDs.

Example 9 may include the subject matter of any one of examples 1-8, where the particular LED is one of a plurality of LEDs in the array of pixels, and another one of the plurality of LEDs is located in another portion of the backplane, the other LED is to implement another one of the array of pixels, and another local memory is located in the other portion of the backplane and serves as local memory for the other pixel, where the other LED is controlled based on pixel state data stored in the other local memory.

Example 10 may include the subject matter of any one of examples 1-9, further including an interface to couple to a host processor, where display data is received for the display from the host processor on the interface, and the host processor is separate from the backplane.

Example 11 may include the subject matter of any one of examples 1-10, where the LED includes a microLED.

Example 12 is a non-transitive machine accessible storage medium having instructions stored thereon, where the instructions, when executed on a machine, causes the machine to: identify display data corresponding to graphics to be presented on a display, where the graphics are to transition from a first frame to a second frame based on the display data, the display includes a backplane with an array of light emitting diodes (LEDs) to implement a plurality of pixels of the display, the backplane further includes a plurality of memory elements to serve as local memory for each one of the plurality of pixels, and at least some of the plurality of memory elements are located on the backplane between LEDs in the array of LEDs; determine, from the display data, that a first subset of the plurality of pixels are to retain respective pixel values in the transition from the first frame to the second frame; determine, from the display data, that a second subset of the plurality of pixels are to change from a respective previous value in the first frame to a respective new value in the second frame; and cause a set of signals to be sent to write data to a subset of the plurality of memory elements, where the subset of memory elements serve as local memory for the second subset of pixels, and the data is written to the subset of memory elements to identify the respective new pixel values for the second subset of pixels, where each LED in the array of LEDs is driven by a corresponding value stored in the respective local memory for the LED.

Example 13 may include the subject matter of example 12, where the array of LEDs includes an array of microLEDs.

Example 14 may include the subject matter of any one of examples 12-13, where the instructions, when executed, further cause the machine to cause a graphics operation to be performed for a particular one of the plurality of pixels by execution unit circuitry on the backplane, where the execution unity circuitry is positioned between two LEDs in the array of LEDs.

Example 15 may include the subject matter of example 14, where the graphics operation includes one of gamma correction, color calibration, or tone mapping at the particular pixel.

Example 16 may include the subject matter of any one of examples 12-15, where a second subset of the memory elements implementing local memory for the first set of pixels retain respective pixel values for the first set of pixels to cause presentation of the first set of pixels to remain static over the transition from the first frame to the second frame.

Example 17 is a method including: identifying display data corresponding to graphics to be presented on a display, where the graphics are to transition from a first frame to a second frame based on the display data, the display includes a backplane with an array of light emitting diodes (LEDs) to implement a plurality of pixels of the display, the backplane further includes a plurality of memory elements to serve as local memory for each one of the plurality of pixels, and at least some of the plurality of memory elements are located on the backplane between LEDs in the array of LEDs; determining, from the display data, that a first subset of the plurality of pixels are to retain respective pixel values in the transition from the first frame to the second frame; determining, from the display data, that a second subset of the plurality of pixels are to change from a respective previous value in the first frame to a respective new value in the second frame; and causing a set of signals to be sent to write data to a subset of the plurality of memory elements, where the subset of memory elements serve as local memory for the second subset of pixels, and the data is written to the subset of memory elements to identify the respective new pixel values for the second subset of pixels, where each LED in the array of LEDs is driven by a corresponding value stored in the respective local memory for the LED.

Example 18 may include the subject matter of example 17, where the array of LEDs includes an array of microLEDs.

Example 19 may include the subject matter of any one of examples 17-18, further including causing a graphics operation to be performed for a particular one of the plurality of pixels by execution unit circuitry on the backplane, where the execution unity circuitry is positioned between two LEDs in the array of LEDs.

Example 20 may include the subject matter of example 19, where the graphics operation includes one of gamma correction, color calibration, or tone mapping at the particular pixel.

Example 21 may include the subject matter of any one of examples 17-20, where a second subset of the memory elements implementing local memory for the first set of pixels retain respective pixel values for the first set of pixels to cause presentation of the first set of pixels to remain static over the transition from the first frame to the second frame.

Example 22 may include the subject matter of any one of examples 17-21, where the method is performed, at least in part, by a host processor platform, where the host processor platform interfaces with the display.

Example 23 may include the subject matter of any one of examples 17-21, where the method is performed by circuitry at the display.

Example 24 is a system including means to perform the method of any one of examples 17-21.

Example 25 is a system including: a host platform including: a data processor; and a memory; and a display to interface with the host platform, where the display includes: a backplane; a plurality of light emitting diode (LED) elements mounted on the backplane to implement an array of pixels of the display; and a plurality of memory elements mounted on the backplane, where at least some of the plurality of memory elements are mounted between LED elements in the plurality of LED elements, and the plurality of memory elements provide local memory for the array of pixels, where each one of the plurality of LED elements is driven based on a respective pixel value stored in the local memory of the respective pixel implemented by the LED element.

Example 26 may include the subject matter of example 25, where the display further includes a plurality of execution unit circuits mounted on the backplane, at least a portion of the plurality of execution unit circuits are positioned between LED elements in the plurality of LED elements, and the plurality of execution units are to perform graphics processing functions for pixels in the array of pixels.

Example 27 may include the subject matter of any one of examples 25-26, where the system includes a laptop computer, the laptop computer includes a base and a lid, the host platform is implemented in the base, and the display is implemented in the lid.

Example 28 may include the subject matter of any one of examples 25-27, where each one of the plurality of LED elements includes a respective microLED device.

Example 29 may include the subject matter of any one of examples 25-28, where a particular one of the memory elements is to serve as local memory for a particular one of the array of pixels, the particular pixel is implemented by a particular one of the plurality of LED elements, the particular LED element is located in a subarea of the backplane associated with a position of the particular pixel, and the particular memory element is also located in the subarea.

Example 30 may include the subject matter of example 29, where the host platform includes a system on chip (SoC).

Example 31 may include the subject matter of any one of examples 25-30, further including a high-speed interconnect to couple the host platform to the display.

Example 32 may include the subject matter of any one of examples 25-31, further including a wearable device, where the wearable device includes the display.

Example 33 may include the subject matter of any one of examples 25-32, further including a smartphone, where the smartphone includes the display.

Example 34 may include the subject matter of any one of examples 25-33, where the display includes controller circuitry to send a signal to control presentation of pixels in the display based on display data, where the signal is to cause data to be stored in local memory of at least a portion of the pixels based on the display data.

Example 35 may include the subject matter of example 34, where the controller circuitry is located between two or more LED elements on the backplane.

Example 36 may include the subject matter of any one of examples 34-35, where the controller circuitry includes a plurality of controller blocks, and each one of the plurality of controller blocks interfaces with a respective subset of the plurality of memory elements to controls a corresponding subset of the plurality of LED elements.

Example 37 may include the subject matter of any one of examples 34-36, where the host platform is to generate the display data.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:

a portion of a backplane, wherein the portion is associated with a particular pixel of a display, and the display is to comprise an array of pixels;

a particular light emitting diode (LED) on the portion of the backplane, wherein the particular LED is to implement the particular pixel; and local memory located with the particular LED on the portion of the backplane, wherein the local memory is to store data to be used to control the particular LED and presentation at the particular pixel; and execution unit circuitry to implement a portion of graphics processing logic for the display, wherein the execution unit circuitry is to perform one or more graphics operations for the particular pixel using data stored in the local memory, wherein the execution unit circuitry is located with the particular LED and the local memory on the portion of the backplane.

2. The apparatus of claim 1, wherein the one or more graphics operations to be performed by the execution unit circuitry comprise backend processing operations.

3. The apparatus of claim 1, wherein the one or more graphics operations comprise at least one of gamma correction, color calibration, or tone mapping at the particular pixel.

4. The apparatus of claim 1, further comprising controller circuitry to send a signal to control presentation of the particular pixel based on display data, wherein the signal is to cause data to be stored in the local memory based on the display data.

5. The apparatus of claim 4, wherein the controller circuitry is located with the particular LED on the portion of the backplane.

6. The apparatus of claim 4, wherein the data is to be stored in the local memory to reflect a change in pixel state for the particular pixel based on the display data, and the data overwrites other data associated with a previous pixel state.

7. The apparatus of claim 6, wherein the pixel state of the particular pixel is to remain unchanged based on other display data, the controller circuitry refrains from signaling the particular LED based on the other display data, and illumination of the particular LED remains static in response to the other display data based on the data stored in the local memory.

8. The apparatus of claim 4, wherein the particular LED is one of a plurality of LEDs in the array of pixels, and the apparatus further comprises a plurality of controllers, wherein each of the plurality of controllers controls a respective subset of the plurality of LEDs.

9. The apparatus of claim 1, wherein the particular LED is one of a plurality of LEDs in the array of pixels, and another one of the plurality of LEDs is located in another portion of the backplane, the other LED is to implement another one of the array of pixels, and another local memory is located in the other portion of the backplane and serves as local memory for the other pixel, wherein the other LED is controlled based on pixel state data stored in the other local memory.

10. The apparatus of claim 1, further comprising an interface to couple to a host processor, wherein display data is received for the display from the host processor on the interface, and the host processor is separate from the backplane.

11. The apparatus of claim 1, wherein the LED comprises a microLED.

12. At least one non-transitive machine accessible storage medium having instructions stored thereon, wherein the instructions, when executed on a machine, causes the machine to:

identify display data corresponding to graphics to be presented on a display, wherein the graphics are to transition from a first frame to a second frame based on the display data, the display comprises a backplane with an array of light emitting diodes (LEDs) to implement a plurality of pixels of the display, the backplane further comprises a plurality of memory elements to serve as local memory for each one of the plurality of pixels, and at least some of the plurality of memory elements are located on the backplane between LEDs in the array of LEDs;

determine, from the display data, that a first subset of the plurality of pixels are to retain respective pixel values in the transition from the first frame to the second frame;

determine, from the display data, that a second subset of the plurality of pixels are to change from a respective previous value in the first frame to a respective new value in the second frame; and cause a set of signals to be sent to write data to a subset of the plurality of memory elements, wherein the subset of memory elements serve as local memory for the second subset of pixels, and the data is written to the subset of memory elements to identify the respective new pixel values for the second subset of pixels, wherein each LED in the array of LEDs is driven by a corresponding value stored in the respective local memory for the LED.

13. The storage medium of claim 12, wherein the array of LEDs comprises an array of microLEDs.

14. The storage medium of claim 12, wherein the instructions, when executed, further cause the machine to:

cause a graphics operation to be performed for a particular one of the plurality of pixels by execution unit circuitry on the backplane, wherein the execution unity circuitry is positioned between two LEDs in the array of LEDs.

15. The storage medium of claim 12, wherein a second subset of the memory elements implementing local memory for the first set of pixels retain respective pixel values for the first set of pixels to cause presentation of the first set of pixels to remain static over the transition from the first frame to the second frame.

16. A system comprising:

a host platform comprising:

a data processor; and a memory; and a display to interface with the host platform, wherein the display comprises:

a backplane;

a plurality of light emitting diode (LED) elements mounted on the backplane to implement an array of pixels of the display; and a plurality of memory elements mounted on the backplane, wherein at least some of the plurality of memory elements are mounted between LED elements in the plurality of LED elements, and the plurality of memory elements provide local memory for the array of pixels, wherein each one of the plurality of LED elements is driven based on a respective pixel value stored in the local memory of the respective pixel implemented by the LED element, the host platform is to cause graphics to be presented in consecutive frames on the display, and respective pixel values are to be retained in the local memory when the corresponding pixels remain unchanged between the consecutive frames.

17. The system of claim 16, wherein the display further comprises a plurality of execution unit circuits mounted on the backplane, at least a portion of the plurality of execution unit circuits are positioned between LED elements in the plurality of LED elements, and the plurality of execution units are to perform graphics processing functions for pixels in the array of pixels.

18. The system of claim 16, wherein the system comprises a laptop computer, the laptop computer comprises a base and a lid, the host platform is implemented in the base, and the display is implemented in the lid.

19. The system of claim 16, wherein each one of the plurality of LED elements comprises a respective microLED device.

20. The system of claim 16, wherein a particular one of the memory elements is to serve as local memory for a particular one of the array of pixels, the particular pixel is implemented by a particular one of the plurality of LED elements, the particular LED element is located in a subarea of the backplane associated with a position of the particular pixel, and the particular memory element is also located in the subarea.

* * * * *